United States Patent [19]

Allen et al.

[11] Patent Number: 4,652,624
[45] Date of Patent: Mar. 24, 1987

[54] ROOM-TEMPERATURE-CURING SILICONE SEALANTS

[75] Inventors: Phillip R. Allen; Charles A. Romig, both of Midland, Mich.

[73] Assignee: Dow Corning Corporation, Midland, Mich.

[21] Appl. No.: 835,139

[22] Filed: Mar. 3, 1986

[51] Int. Cl.$^4$ ............................................. C08G 77/06
[52] U.S. Cl. ..................................... 528/17; 524/860; 528/34; 528/35
[58] Field of Search .......................... 528/17, 34, 35; 524/860

[56] References Cited

U.S. PATENT DOCUMENTS

| | | | |
|---|---|---|---|
| 3,122,522 | 2/1964 | Brown et al. | 260/46.5 |
| 3,175,993 | 3/1965 | Weyenberg | 260/46.5 |
| 3,334,067 | 8/1967 | Weyenberg | 260/46.5 |
| 3,383,355 | 5/1968 | Cooper | 260/46.5 |
| 3,856,839 | 12/1974 | Smith et al. | 260/429.5 |
| 4,111,890 | 9/1978 | Getson et al. | 260/375 B |
| 4,438,039 | 3/1984 | Beer et al. | 260/429.5 |
| 4,461,867 | 7/1984 | Supremant | 528/17 |

FOREIGN PATENT DOCUMENTS 123935 11/1984 European Pat. Off. .

*Primary Examiner*—Melvyn I. Marquis
*Attorney, Agent, or Firm*—Edward C. Elliott

[57] ABSTRACT

This invention is a method of improving the shelf life and oil resistance of silicone elastomeric sealants which are based upon hydroxyl endblocked polydiorganosiloxanes, alkyltrialkoxysilane, and titanate catalyst. The improvement is accomplished by the addition of from 10 to 100 parts by weight of silethylene ended polymer of the formula

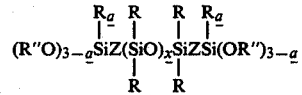

where each R is an organic radical selected from methyl, ethyl, propyl, phenyl, and trifluoropropyl, each R″ is methyl or ethyl, Z is an ethylene radical or combination of ethylene radicals and siloxane radicals, a is 0 or 1, and x is of a value such that the polymer has a viscosity of from 0.05 to 10 Pa.s at 25° C.

8 Claims, No Drawings

ROOM-TEMPERATURE-CURING SILICONE SEALANTS

BACKGROUND OF THE INVENTION

1. Field of the Invention

This invention is concerned with a method of improving the oil swell resistance and shelf life of silicone sealants which comprise hydroxyl endblocked polydiorgano-siloxane, alkyltrialkoxysilane, and titanium catalyst.

2. Background Information

One of the current methods of producing room-temperature-curing silicone elastomeric sealants makes use of hydroxyl endblocked polydiorganosiloxanes, alkyl-tri-alkoxysilane crosslinking agents, and titanium based catalyst. Such sealants are stable in the absence of moisture, but cure when exposed to moisture, as by being exposed to the atmosphere. Experience with this type of sealant has revealed that upon storage there is a tendency for the sealant to lose the ability to cure. This is particularly undesirable because the sealant can be expelled from the tube into the desired location for sealing without the user being aware that there is anything wrong. It is then necessary to physically remove all of the old non-curing sealant and replace it with new. This is a very time consuming and expensive process. Because of this type of failure upon storage, it became imperative that a method of producing a non-acid, non-corrosive silicone sealant be developed. Another problem with conventional sealants was their tendency to swell in the presence of oil, as when the sealant was used to form a gasket. Improved resistance to swelling in the presence of oil was desired.

There are many patents directed to the system of producing silicone sealants based upon the use of alkoxy functional polymers, alkoxy functional crosslinkers, and titanate catalysts. Representative of these is U.S. Pat. No. 3,334,067, issued August 1, 1967, to Weyenberg. Weyenberg discloses a method of making one component room-temperature-curing siloxane rubber. His compositions are stable in the absence of moisture, but cure upon exposure to moisture. The method comprises mixing in the absence of moisture a hydroxy endblocked siloxane polymer, a silane of the formula R′Si(OR″)$_3$ and a beta-dicarbonyl titanium compound.

In U.S. Pat. No. 3,383,355, issued May 14, 1968, Cooper discloses polymers having alkoxy groups bonded to terminal silicon atoms by reacting a hydroxylated organosiloxane polymer with an alkoxy silane in the presence of a suitable catalyst. He discloses that such functional diorganopoly-siloxanes having from two to three alkoxy radicals attached to each terminal silicon atom are curable in the presence of moisture and a suitable hydrolysis and condensation catalyst to a rubbery material.

Smith et al., in U.S. Pat. No. 3,856,839, issued Dec. 24, 1974, disclose alkanedioxy titanium chelates which catalyze the cure of a composition which also contains methyltrimethoxysilane and a silanol chain-stopped polydiorganosiloxane fluid. The particular chelated titanium compound is stated to be desirable because it does not cause thickening during the manufacture of the composition as does the previously known titanium compounds.

An improved version of the above compositions is disclosed by Getson et al. in U.S. Pat. No. 4,111,890, issued Sept. 5, 1978, in which the hydrocarbonoxy groups linked to the organopolysiloxane, organosilicon compound and the titanium ester groups are the same. They disclose that previous compositions have a short shelf-life even when kept under substantially anhydrous conditions, and that the longer these compositions are stored, the lower the property profile becomes.

It is disclosed in U.S. Pat. No. 4,438,039, issued Mar. 20, 1984, that the shelf life of some of the commercial compositions was determined by an appearance problem, manifesting itself in the formation of various sizes of crystals ranging from fine sand-like to pellet-like particles. This patent discloses a particular titanium catalyst which does not form nodules upon storage.

None of the prior art as discussed above discloses any solution for the problem of failure to cure after prolonged storage that is discussed above. After a prolonged investigation into the possible causes of such a storage failure, the solution to the problem was discovered. Once the solution to the problem is known, other background information becomes of interest.

U.S. Pat. No. 3,122,522, issued Feb. 25, 1964 to Brown and Hyde discloses a siloxane composition, each molecule of which consists essentially of (1) at least two units of the formula

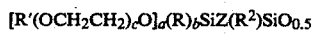

and units of the formula R$_d$SiO$_{4-d/2}$ where each a has a value ranging from 2 to 3, each b has a value ranging from 0 to 1, the sum of a and b in any unit (1) is no greater than 3, each c has a value ranging from 1 to 2, each d has a value ranging from 0 to 2, and Z is a divalent hydrocarbon radical of from 2 to 18 inclusive carbon atoms, Z being free of aliphatic unsaturation. Each molecule of the silicone composition has an average of from 1.3 to 2 R groups per silicon atom and there are at least 7 units of R$_d$SiO$_{4-d/2}$ per molecule.

U.S. Pat. No. 3,175,993, issued Mar. 30, 1965 to Weyenberg discloses a composition consisting essentially of the average formula

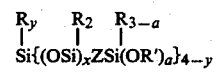

in which each R is free of aliphatic unsaturation, Z is a divalent hydrocarbon radical free of aliphatic unsaturation, y has a value of from 0 to 2 inclusive, x has a value of at least 3 and a has an average value from 2 to 3 inclusive.

Both of the above references teach preparation of the siloxane by reacting siloxanes containing —SiH groups with the appropriate silane containing a monovalent hydrocarbon radical containing an aliphatic or cycloaliphatic group in the presence of a platinun catalyst through the reaction of the —SiH and aliphatic C═C group. This reaction produces the divalent Z radical. Alternatively, the C═C group can be on the siloxane and the —SiH can be on the silane.

European Patent Application No. 123 935 A, published Nov. 7, 1984 by Toten and Pines, discloses an alkoxysilyl functional silicone including at least one functional group of the formula

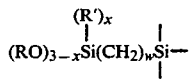

where w is an integer of from 2 to about 20, useful as capable of imparting satisfactory lubricity and other properties such as softness to a variety of textile fabrics.

None of the disclosures in this background information is of any assistance in solving the problem of how to improve the shelf life of silicone sealants that lose the ability to cure upon long time storage in the absence of moisture, said sealants being catalyzed with titanium compounds.

SUMMARY OF THE INVENTION

This invention relates to the improvement of silicone sealants based upon hydroxyl endblocked polydiorganosiloxane, alkyltrialkoxysilane, and titanate catalyst by adding to 100 parts of the polydiorganosiloxane, from 10 to 100 parts of a polydiorganosiloxane having the end silicon atoms separated by a divalent hydrocarbon radical or a combination of divalent hydrocarbon radicals and siloxane radicals.

DESCRIPTION OF THE INVENTION

This invention is a method of improving the oil swell resistance of silicone sealants comprising (A) mixing in the absence of moisture (1) 100 parts by weight of hydroxyl endblocked polydiorganosilane having a viscosity of from 0.1 to 1000 Pa.s at 25° C. and organic radicals selected from methyl, ethyl, propyl, phenyl, and trifluoropropyl, (2) from 10 to 100 parts by weight of polydiorganosiloxane of the formula

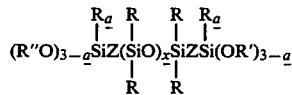

where each R is an organic radical selected from methyl, ethyl, propyl, phenyl, and trifluoropropyl, each R" is methyl or ethyl, Z is an ethylene radical or combination of ethylene radicals and siloxane radicals, a is 0 or 1, and x is of a value such that the polymer has a viscosity of from 0.05 to 10 Pa.s at 25° C., (3) from 0.35 to 9.0 parts by weight of an alkyltrialkoxysilane of the formula $R'Si(OR'')_3$ where R' is methyl, ethyl, propyl, phenyl, or trifluoropropyl, and R" are as defined above, (4) titanium catalyst, and (5) optionally filler, to yield a composition which is stable in the absence of moisture, but which cures in the presence of moisture to a silicone elastomer.

The method of this invention produces an improved sealant which has a better shelf life and improved resistance to hot oil when compared to similar sealants that do not include the silethylene ended polymer.

The hydroxyl endblocked polydiorganosiloxane (1) is of the formula

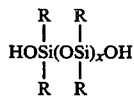

where R is methyl, ethyl, propyl, or trifluoropropyl radical. The value of x is such that the viscosity of the polymer is from 0.1 to 1000 Pa.s at 25° C. The physical properties of the resultant elastomeric sealant are not high enough if lower viscosity polymers are used. If higher molecular weight polymers are used, the stiffness of the resultant sealant tends to be so great that the sealant is difficult to form. Preferred are viscosities from 1.0 to 100 Pa.s at 25° C. The use and manufacture of this type of polymer is known in the art. They are produced by the hydrolysis of the appropriate dialkylchlorosilane to produce a cyclic material and the subsequent polymerization of the purified cyclic material.

The alkyltrialkoxysilane (3) is used in the composition to crosslink the composition to form an elastomer upon cure. The alkyl radical is selected from methyl, ethyl, propyl, phenyl, and trifluoropropyl radicals. The silane may have all the same alkyl radicals or combinations of radicals. The alkoxy radicals are selected from methoxy and ethoxy. The silane may have all the same alkoxy radicals or combinations of radicals. The preferred silane in methyl-trimethoxysilane.

The physical properties of the cured sealant can be modified by the addition of silane having the formula $R_2Si(OR'')_2$ or $R_3Si(OR'')$. When a silane having two alkoxy groups is added to the composition, the silane acts as a chain extending agent and results in a sealant having a higher degree of elasticity. The same result would be obtained if a higher molecular weight hydroxy endblocked polydiorganosiloxane (1) had been employed; however, the use of such a higher molecular weight polymer would result in a much higher viscosity of the composition resulting in difficulties in handling the composition. For use as sealants, it is desirable that the composition have a viscosity such that it is a smooth, easily spread paste. When a silane having only one alkoxy group in added to the composition, the silane acts as a chain stopping agent and the resulting sealant has a higher modulus of elasticity. The silanes are well-known in the art and are described in U.S. Pat. Nos. 2,843,555, 2,927,907, and 3,127,363.

The titanium catalyst (4) used in this invention can be any of those known to be useful in catalyzing the moisture induced reaction of alkoxy containing siloxanes. Such titanium catalysts include titanium esters such as tetrabutyltitanate, tetra-2-ethylhexyltitanate, tetraphenyltitanate, and triethanolaminetitanate. Useful catalysts include organosiloxytitanium compounds such as those described in U.S. Pat. No. 3,294,739, issued Dec. 27, 1966, and beta-dicarbonyl titanium compounds such as those described in U.S. Pat. No. 3,334,067, issued Aug. 1, 1967, both of which are hereby incorporated by reference to show titanium catalyst and methods of manufacture.

The silicone sealants of this invention will usually contain a filler to reinforce and extend the polymer. The preferred reinforcing fillers are fumed or precipitated silica having a surface area of from 150 m²/g to 400 m²/g. The surface of the silica can be treated or untreated. The amount of reinforcing silica is up to about 35 parts by weight of silica per 100 parts by weight of the polymer (1). If higher amounts of reinforcing silica are used, the viscosity of the sealant becomes too high to allow for easy extrusion of the sealant from its storage tube. Extending fillers are used to modify the sealant properties, to make the sealant opaque, and to reduce the cost of the ingredients, for example. Typical of the extending fillers are titanium dioxide, zirconium silicate, iron oxide, ground quartz, and calcium carbonate. Any finely ground material which does not interfere with the storage or cure of the sealant can be used as a filler, depending upon what properties are desired in the product. By finely ground is meant an average particle size of less than 10 micrometers. Particles larger than these result in a grainy composition.

The most critical of the ingredients used in this invention is the polydiorganosiloxane (2) of the formula

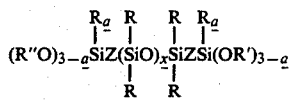

where each R is an organic radical selected from methyl, ethyl, propyl, phenyl and trifluoropropyl, each R" is methyl or ethyl, Z is an ethylene radical or combination of ethylene radicals and siloxane radicals, a is 0 or 1, and x is of a value such that the polymer has a viscosity of from 0.05 to 10 Pa.s at 25° C. It is by the addition of this silethylene ended polydiorganosiloxane that the improvement in the sealant of this invention is made. It has been found that silicone elastomeric sealants of the type based upon hydroxyl endblocked polydiorganosiloxane, alkyltrialkoxysilane, and titanate catalyst; or upon alkoxy endblocked polydiorganosiloxane and titanate catalyst, lose the ability to cure upon exposure to moisture after the sealant is stored for a long period of time in a storage container. The addition of the silethylene ended polymer aids in preventing this loss of curablity. The addition of the silethylene polymer also improves the resistance of the cured sealant to the effects of immersion or exposure to hot oil.

A preferred polymer is one of the formula

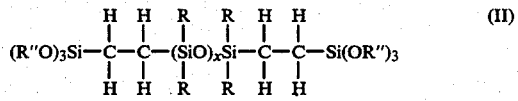

or of the formula

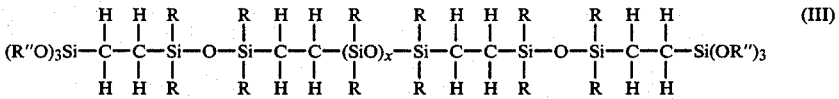

where R and R" are as described above, with methyl being most preferred. The radicals can be the same or combinations of the above where at least 50 mol percent of the radicals are methyl radicals.

The polymer of the formula (II) may be produced by reacting a hydrogen endblocked siloxane with a silane of the formula

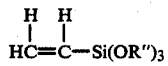

in the presence of a platinum catalyst such as chloroplatinic acid at a temperature of from 30° to 150° C. Methods of making these polymers are taught in U.S. Pat. No. 3,175,993, issued Mar. 30, 1965, to Weyenberg, which is hereby incorporated by reference to show methods of manufacturing polymer of formula (II).

The polymer of formula (III) is manufactured by reacting a vinyl endblocked polydiorganosiloxane with an endcapping composition of the formula

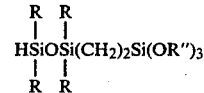

where R and R" are as defined above, using a platinum catalyst to cause the materials to react. This endcapping composition is prepared by reacting ViSi(OR")$_3$ with (R$_2$HSi)$_2$O in the presence of a platinum catalyst where only one end of the disilane is reacted. This can be done by combining 1 mol of the ViSi(OR")$_3$ with greater than 2 mols of the disilane. When this mixture is combined with a platinum catalyst, there is a slightly exothermic reaction after a few minutes at room temperature. The color changes from clear to light yellow. A byproduct will be present consisting of product produced by the reaction of ViSi(OR")$_3$ to both ends of the silane. This byproduct can be left in the material. At a 1 to 2 ratio, there is about 15 percent byproduct produced. If the ratio is changed to 1 to 4 the byproduct drops to about 5 percent. The excess silane is then stripped from the product.

The method of this invention prepares the silicone elastomeric sealant by mixing ingredients (1) through (5) together into a homogeneous mixture. The mixture will immediately begin to crosslink and cure if there is any moisture present, as in the ingredients or in the atmosphere surrounding the mixture. If the mixture is to be used immediately, this may be satisfactory, but a procedure in which the mixing is carried out in the absence of moisture is necessary in order to produce a sealant which can be stored before use.

A preferred method first mixes the hydroxyl endblocked polydiorganosiloxane (1) with any filler (5) and any filler treating agent which may be used. This mixture is stirred vigorously at temperatures of from room temperature to 175° C. to thoroughly disperse the filler in the polymer. Preferably, the mixing takes place at elevated temperature with a vacuum applied to the container or a sweep of dry inert gas over the contents of the mixer to remove any moisture which may be present in the mixture, which is commonly called a base. Then the dried base is placed in a sealable mixer in which liquid ingredients can be added without exposure to moisture. Then the silethylene ended trialkoxy functional polydiorganosiloxane (2), the alkyltrialkoxysilane (3), and the titanium catalyst (4) are added without exposure to moisture and the mixture is placed in storage containers. A final period under a vacuum is applied to the material in the storage containers to assure that all moisture and volatile materials are removed from the container and the container is sealed. When it is desired to use the material, the seal is removed and the sealants is removed from the container, as by extruding through a nozzle, and placed in the desired location. Exposure to the air allows the moisture in the air to react with the sealant and cause the sealant to cure into a silicone elastomer.

The compositions produced by the method of this invention are particularly useful as silicone elastomeric sealants. They are extruded into a gap or space and allowed to cure to form a seal. They can be used to make formed-inplace gaskets; a procedure where the sealant is applied to the surface of a joint, the other side of the joint is placed over the sealant, and the sealant is allowed to cure, producing a sealed joint. Examples of such gaskets are found in oil pan seals in automobiles, in which case the resistance of the seal to hot oil is of importance.

The following examples are included for illustrative purposes only and should not be construed as limiting the invention which is properly set forth is the appended claims. All parts are parts by weight.

EXAMPLE 1

A series of compositions were prepared to illustrate this invention.

First, a silethylene ended polymer was prepared by reacting an equilibrium mixture of polydimethylcyclosiloxane with enough tetramethyldisiloxane endblocker to yield a polymer having about 35 siloxy units in the polymer chain, using a reaction column containing an acid clay as catalyst. The resulting mixture of cyclic and linear materials was then vacuum distilled to remove the cyclic materials, about 15 percent by weight of the mixture. The linear fluid, having essentially —SiMe$_2$H ends was reacted with a 10 percent theoretical excess of vinyltrimethoxysilane in the presence of about 30 parts of platinum per million parts of fluid in the form of a chloroplatinic acid complex of divinyltetramethyldisiloxane diluted with dimethylvinylsiloxy endblocked polydimethylsiloxane to provide 0.7 weight percent platinum. After allowing the reaction to occur at room temperature, the excess vinyltrimethoxysilane was stripped from the fluid. The fluid had a viscosity of about 0.07 Pa.s at 25° C. and had trimethoxysilethylene end groups of the formula

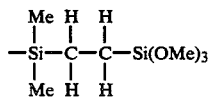

A base was prepared by mixing together in a heavy duty mixer capable of being sealed and having a vacuum applied to it, 100 parts of a mixture of hydroxyl endblocked polydimethylsiloxane with an approximate number average molecular weight of 40,000 with cyclic polydimethylsiloxane with a DP of from 4 to 30, the mixture having a viscosity of about 13.5 Pa.s at 25° C., 30 parts of fume silica having a surface area of about 150 m$^2$/g, and 9 parts of hydroxyl endblocked polymethylphenylsiloxane having a viscosity of about 0.5 Pa.s at 25° C. and about 4.5 weight percent siliconbonded hydroxyl radicals. The mixture was prepared by first mixing the two fluids together and then adding the filler in three increments, mixing each sufficiently to wet out the filler before adding the next increment. The mixture was then heated to 175° C. and placed under a full vacuum for 1 hour while continuing mixing. The mixture was cooled in 30 minutes to room temperature while continuing the vacuum.

Portions of this base were then placed in a sealed mixer and placed under vacuum to remove any moisture. Each portion was then mixed with the ingredients shown in Table I to make a sealant and placed in sealant storage containers, all without contact with moisture. Compositions 1 and 3 contained a fluid like the polymer prepared above, but without the conversion to the silethylene end. Compositions 2 and 4 contained the silethylene ended polymer described above. Compositions 1 and 2 were catalyzed with tetraisopropyltitanate (TIPT) while compositions 3 and 4 were catalyzed with diisopropyldiethylacetoacetate titanium (TDIDE). All of the compositions were crosslinked with 9 parts of methyltrimethoxysilane.

After a 1 week aging period in the storage tubes, samples of the sealant were removed and formed into sheets. The time necessary for the surface of the sheet to become skinned over (SOT) was measured, as was the time necessary for the surface to loose its tack (TFT). The sheets were allowed to cure at room temperature and humidity for one week and were then cut into test samples and measured for durometer according to ASTM D2240. Samples of the cured rubber were placed in 5W30 motor oil at 150° C. for 1 week and were then measured for change in durometer. The storage tubes of sealant were placed in an oven at 50° C. for 8 weeks as an accelerated aging test and then tested as above after an additional 6 weeks at room temperature. Other samples which had aged for 14 weeks at room temperature were also then tested. The results of the tests are shown in Table I.

TABLE I

| Sample | 1# | 2 | 3# | 5 |
|---|---|---|---|---|
| fluid | 20 | — | 20 | — |
| silethylene fluid | — | 20 | — | 20 |
| TIPT | 2 | 2 | — | — |
| TDIDE | — | — | 3 | 3 |
| Initial properties SOT, minutes | 7 | 7 | 7 | 7 |
| TFT, minutes | 32 | 33 | 22 | 20 |
| Durometer, Shore A | 54 | 50 | 51 | 50 |
| After 2 weeks at 150° C. in 5W30 Motor Oil Durometer, | | | | |
| Shore A | N/A | N/A | 0 | 5 |
| After 8 weeks at 150° C. and 6 weeks at Room Temperature | | | | |
| SOT, minutes | 20 | 15 | 10 | 9 |
| TFT. minutes | 95 | 50 | 27 | 20 |
| Durometer, Shore A | 6 | 26 | 17 | 46 |
| Properties After 14 weeks at room Temperature | | | | |
| SOT, minutes | 13 | 14 | 8 | 7 |
| TFT, minutes | 37 | 38 | 25 | 18 |
| Durometer | 44 | 46 | 42 | 43 |

Comparative example

The data shows that the compositions containing the silethylene ends give less change in properties upon aging and after exposure to hot oil.

That which is claimed is:

1. A method of improving the oil swell resistance of silicone sealants comprising
   (A) mixing in the absence of moisture
   (1) 100 parts by weight of hydroxyl endblocked polydiorganosilane having a viscosity of from 0.1 to 1000 Pa.s at 25° C. and organic radicals selected from methyl, ethyl, propyl, phenyl, and trifluoropropyl,
   (2) from 10 to 100 parts by weight of polydiorganosiloxane of the formula

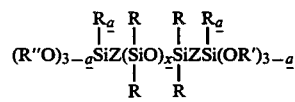

where each R is an organic radical selected from methyl, ethyl, propyl, phenyl, and trifluoropropyl, each R″ is methyl or ethyl, Z is an ethylene radical or combination of ethylene radicals and siloxane radicals, a is 0 or 1, and x is of a value such that the polymer has a viscosity of from 0.05 to 10 Pa.s at 25° C., (3) from 0.35 to 9.0 parts by weight of an alkyltrialkoxysilane of the formula R'Si(OR")$_3$ where R' is methyl, ethyl, propyl, phenyl, or trifluoropropyl, and R" is as defined above, (4) titanium catalyst, and (5) optionally filler, to yield a composition which is stable in the absence of moisture, but which cures in the presence of moisture to a silicone elastomer.

2. The method of claim 1 in which the hydroxyl endblocked polydiorganosiloxane (1) is a polydimethylsiloxane having a viscosity of from 5 to 30 Pa.s at 25° C.

3. The method of claim 1 in which the alkyltrialkoxysilane (3) is methyltrimethoxysilane.

4. The method of claim 1 in which the titanium catalyst (4) is a titanium ester, an organosiloxytitanium compound, a beta-dicarbonyl titanium compound, or mixtures thereof.

5. The method of claim 1 in which a filler (5) is present.

6. The method of claim 1 in which the polydiorganosiloxane (2) is of the formula

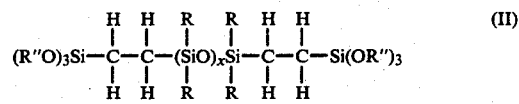

where each R is an organic radical selected from methyl, ethyl, propyl, phenyl, and trifluoropropyl, and each R" is methyl or ethyl.

7. The method of claim 1 in which the polydiorganosiloxane (2) is of the formula

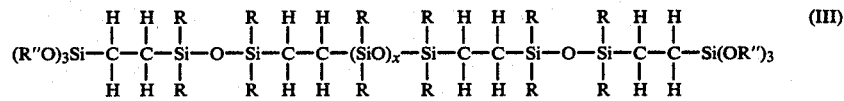

where each R is an organic radical selected from methyl, ethyl, propyl, phenyl, and trifluoropropyl, each R" is methyl or ethyl, and x is of a value such that the polymer has a viscosity of from 0.05 to 10 Pa.s at 25° C.

8. The composition produced by the method of claim 1.

* * * * *